US012703790B2

(12) United States Patent
Cavalieri et al.

(10) Patent No.: US 12,703,790 B2
(45) Date of Patent: Aug. 11, 2026

(54) POLYOLEFINS COMPOSITIONS OBTAINED FROM RECYCLED POLYOLEFINS

(71) Applicant: Basell Poliolefine Italia S.r.l., Milan (IT)

(72) Inventors: Claudio Cavalieri, Ferrara (IT); Monica Galvan, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 841 days.

(21) Appl. No.: 18/013,481

(22) PCT Filed: Jun. 17, 2021

(86) PCT No.: PCT/EP2021/066331

§ 371 (c)(1),
(2) Date: Dec. 28, 2022

(87) PCT Pub. No.: WO2022/002602

PCT Pub. Date: Jan. 6, 2022

(65) Prior Publication Data

US 2023/0250266 A1 Aug. 10, 2023

(30) Foreign Application Priority Data

Jun. 30, 2020 (EP) .................................... 20183316

(51) Int. Cl.
*C08L 23/12* (2006.01)

(52) U.S. Cl.
CPC ........... *C08L 23/12* (2013.01); *C08L 2205/03* (2013.01)

(58) Field of Classification Search
CPC ........ C08F 10/06; C08F 110/06; C08F 2/001; C08F 210/06; C08F 210/16; C08F 2500/12; C08F 2500/17; C08F 2500/27; C08F 2500/30; C08F 2500/31; C08F 4/651; C08F 4/6543; C08L 2205/03; C08L 2207/10; C08L 2207/20; C08L 23/06; C08L 23/12; C08L 23/16
See application file for complete search history.

(56) References Cited

U.S. PATENT DOCUMENTS

| | | | |
|---|---|---|---|
| 4,399,054 | A | 8/1983 | Ferraris et al. |
| 4,469,648 | A | 9/1984 | Ferraris et al. |
| 4,522,930 | A | 6/1985 | Albizzati et al. |
| 2009/0253868 | A1 | 10/2009 | Massari et al. |
| 2013/0316213 | A1 | 11/2013 | Ciarafoni et al. |
| 2017/0044359 | A1 | 2/2017 | Kahlen et al. |

FOREIGN PATENT DOCUMENTS

| | | | | |
|---|---|---|---|---|
| EP | 45977 | A2 | 2/1982 | |
| EP | 782587 | A1 | 7/1997 | |
| EP | 1012195 | A1 | 6/2000 | |
| WO | 0063261 | A1 | 10/2000 | |
| WO | 0157099 | A1 | 8/2001 | |
| WO | 2006125720 | A1 | 11/2006 | |
| WO | 2012098086 | A1 | 7/2012 | |
| WO | WO-2019224129 | A1 * | 11/2019 | ............. C08L 23/10 |

OTHER PUBLICATIONS

The International Search Report and The Written Opinion for PCT/EP2021/066331 mailed Oct. 15, 2021.

* cited by examiner

*Primary Examiner* — Ana L. Woodward

(57) ABSTRACT

A polypropylene composition made from or containing:

(a) 65 to 85 weight % of a crystalline propylene polymer having an amount of isotactic pentads (mmmm), measured by 13C-MNR on the fraction insoluble in xylene at 25° C. higher than 97.0 molar % and a polydispersity index from 3 to 15;

(b) 5 to 25 weight % of an elastomeric copolymer of ethylene and propylene, having an amount of recurring units deriving from ethylene ranging from 30 to 70 weight %, and being partially soluble in xylene at ambient temperature; wherein the fraction soluble in xylene at ambient temperature having an intrinsic viscosity value from 3 to 10 dl/g; and (c) 5 to 25 weight % of recycled polyethylene (r-PE) having a melt flow rate (190° C./2.16 Kg) from 0.1 to 10 g/10 min, wherein the polypropylene composition having a melt flow rate (ISO 1133 230° C./2.16 kg) higher than 3.0 to 15 g/10 min.

13 Claims, No Drawings

POLYOLEFINS COMPOSITIONS OBTAINED FROM RECYCLED POLYOLEFINS

This application is the U.S. National Phase of PCT International Application PCT/EP2021/066331, filed Jun. 17, 2021, claiming benefit of priority to European Patent Application No. 20183316.7, filed Jun. 30, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to polyolefin compositions containing recycled polyethylene.

BACKGROUND OF THE INVENTION

Polyolefin compositions, having stiffness, impact resistance, and stress-whitening resistance are useful for injection-molded articles, including automotive battery cases.

In some instances, polyolefin compositions present concerns in terms of sustainability because the production of polyolefin compositions is based on the use of non-renewable sources.

In some instances, and to mitigate these concerns with multicomponent polyolefin compositions, variable amounts of recycled polyolefins such as polypropylene or polyethylene are used.

In some instances, recycled polyolefin is derived from streams of post-consumer waste (PCW) material that undergo various steps of separation from other polymers, such as PVC, PET or PS.

A problem in polyolefin recycling is quantitatively separating polypropylene (PP) from polyethylene (PE) and vice-versa. Although described as recycled PE (rPE) or recycled PP (rPP), the commercially available products from PCW sources are mixtures of PP and PE in various amounts.

In some instances, the presence of additives and minor components in recycled materials causes recycled PP/PE-blends to have poor mechanical and optical properties as well as poor compatibility between the main polymer phases during remolding.

SUMMARY OF THE INVENTION

In a general embodiment, the present disclosure provides a polypropylene composition made from or containing:

(a) 65 to 85 weight %, alternatively 70 to 83 weight %, alternatively 75-80 weight %, of a crystalline propylene polymer having an amount of isotactic pentads (mmmm), measured by $^{13}$C-MNR on the fraction insoluble in xylene at 25° C. higher than 97.0 molar % and a polydispersity index ranging from 3 to 15;

(b) 5 to 25 weight %, alternatively 7 to 20 weight %, alternatively from 8 to 15 weight %, of an elastomeric copolymer of ethylene and propylene, wherein the copolymer having an amount of recurring units deriving from ethylene ranging from 30 to 70 weight %, alternatively 40 to 60 weight %, and being partially soluble in xylene at ambient temperature; wherein the polymer fraction soluble in xylene at ambient temperature having an intrinsic viscosity value ranging from 3 to 10 dl/g; and (c) 5 to 25 weight %, alternatively 7 to 20 weight %, alternatively from 8 to 15 weight %, of recycled polyethylene (r-PE) having a melt flow rate (190° C./2.16 Kg) from 0.1 to 10 g/10 min and containing an amount of polypropylene inclusions ranging from 1 to 15 weight % of the total r-PE component, wherein the polypropylene composition having a value of melt flow rate (ISO 1133 230° C./2.16 kg) ranging from higher than 3.0 g/10 min to 15 g/10 min, alternatively 3.5 to 10 g/10 min, alternatively from 4 to 8 g/10 min; the percentages of (a), (b) and (c) being referred to the sum of (a), (b) and (c).

DETAILED DESCRIPTION OF THE INVENTION

As used herein, the term "copolymer" refers to both polymers with two different recurring units and polymers with more than two different recurring units, such as terpolymers, in the chain. As used herein, the term "ambient temperature" refers to a temperature of about 25° C. (room temperature).

As used herein, the term "crystalline propylene polymer" refers to a propylene polymer having an amount of isotactic pentads (mmmm), measured by $^{13}$C-MNR on the fraction insoluble in xylene at 25° C. higher than 70 molar %. As used herein, the term "elastomeric" polymer refers to a polymer having solubility in xylene at ambient temperature higher than 50 wt %.

In some embodiments, the features of the polymers (a)-(c) are not inextricably linked to each other. Accordingly, and in some embodiments, a level of the features involves the same level or a different level in the remaining features.

Crystalline propylene polymer (a) is selected from a propylene homopolymer and a copolymer of propylene containing at most 3 wt % of ethylene or a $C_4$-$C_{10}$ α-olefin or combination thereof. In some embodiments, the crystalline propylene polymer (a) is a propylene homopolymer.

In some embodiments, in the component (a), the amount of isotactic pentads (mmmm), measured by $^{13}$C-MNR on the fraction insoluble in xylene at 25° C. is higher than 97.5 molar %, alternatively higher than 98 molar %.

In some embodiments, the propylene polymer (a) shows a molecular weight distribution, expressed by the ratio between the weight average molecular weight and numeric average molecular weight, (Mw/Mn), measured by GPC, equal to or higher than 7.5, alternatively from 8 to 20.

In some embodiments, the polydispersity Index ranges from 3 to 10.

In some embodiments, the melt flow rate (ISO 1133 230° C./2.16 kg) of crystalline propylene polymer (a) ranges from 0.1 to 5 g/10 min.

In some embodiments, elastomeric ethylene-propylene copolymer (b) is made from or containing a diene. In some embodiments, the diene is present in amounts ranging from 0.5 to 10 wt % with respect to the weight of copolymer (b). In some embodiments, the diene is conjugated or not. In some embodiments, the diene is selected from the group consisting of butadiene, 1,4-hexadiene, 1,5-hexadiene, and ethylidene-norbornene-1.

In some embodiments, copolymer (b) exhibits a fraction insoluble in xylene at ambient temperature less than 45 wt %, alternatively equal to or lower than 25 wt % of copolymer (b). In some embodiments, the intrinsic viscosity of the xylene soluble fraction at 25° C. ranges from 3.5 to 8 dl/g, alternatively from 4 to 6 dl/g. In some embodiments, the amount of ethylene of the copolymer (b) ranges from 40 to 60 wt. %, alternatively from 45 to 55 wt %.

In some embodiments, r-PE (c) is crystalline or semicrystalline high density PE (r-HDPE). In some embodiments, r-PE(c) is selected from commercial PCW (Post Consumer Waste). In some embodiments, the commercial PCW is from a municipality.

In some embodiments, and prior to the plastic mixture's use, the plastic mixture containing rHDPE undergoes a recycling process including collection, shredding, sorting, and washing. In some embodiments, the sorted rHDPE contains minor amounts of other polymeric and/or inorganic components. In some embodiments, the r-PE contains inclusion of polypropylene in an amount from 1 to 15% wt, alternatively from 5% up to 10% wt, of the total r-PE component.

In some embodiments, the r-PE includes a crystalline polyethylene fraction, wherein the amount of recurring units derived from propylene in the polyethylene chains is lower than 10% wt, alternatively absent. In some embodiments, r-PE is ethylene homopolymer containing the above-mentioned inclusions. In some embodiments, the (r-PE) has a melt flow rate (190° C./2.16 Kg ISO 1133-1) from 0.1 to 1 g/10 min, alternatively from 0.1 to 0.5 g/10 min. In some embodiments, the r-PE is characterized by a density ranging from 0.940 to 0.965 g/cm$^3$.

In some embodiments, the r-PE is commercially available. In some embodiments, the r-PE grade is commercially available from LyondellBasell under the tradename Hostalen QCP5603 in the ivory or grey versions.

In some embodiments, the polypropylene composition of the present disclosure has a tensile modulus value of at least 1200 MPa, alternatively from higher than 1300 to 1800 MPa, alternatively higher than 1400 MPa, alternatively from 1400 to 1600 MPa.

In some embodiments, the value of Charpy impact resistance at 23° C. is higher than 8 kJ/m$^2$, alternatively from more than 10 to 15 kJ/m$^2$. In some embodiments, the Charpy impact resistance at 0° C. is more than 6 kJ/m$^2$, alternatively more than 7 to 12 kJ/m$^2$. In some embodiments, the Charpy impact resistance at −20° C. is from at least 5 to 10 kJ/m$^2$.

In some embodiments, the polypropylene composition of the present disclosure exhibits a tensile strength at yield equal to or higher than 25 MPa. In some embodiments, the polypropylene composition has an elongation at yield equal to or higher than 5%. In some embodiments, the polypropylene composition has a tensile strength at break equal to or higher than 15, alternatively higher than 17 MPa. In some embodiments, the polypropylene composition has an elongation at break equal to or higher than 130%, alternatively higher than 140%.

In some embodiments, the polypropylene composition is obtained by mechanical blending of the components (a)-(c).

In some embodiments, component (c) is mechanically blended with a preformed heterophasic composition made from or containing components (a) and (b) prepared together by a sequential copolymerization process.

In some embodiments, the process includes polymerizing propylene alone or in mixture with a low amount of ethylene in a first stage and then, in a second stage, polymerizing propylene with a higher amount of ethylene, wherein both stages occur in the presence of a catalyst made from or containing the product of the reaction between:

i) a solid catalyst component made from or containing Ti, Mg, Cl, and an internal electron donor compound;

ii) an alkylaluminum compound; and iii) an external electron-donor compound having the formula:

$(R^7)_a(R^8)_bSi(OR^9)_c$, where a and b are integers from 0 to 2, c is an integer from 1 to 4 and the sum (a+b+c) is 4; $R^7$, $R^8$, and $R^9$, are alkyl, cycloalkyl or aryl radicals with 1-18 carbon atoms optionally containing heteroatoms.

In some embodiments, the internal donor is selected from the esters of mono or dicarboxylic organic acids such as benzoates, malonates, phthalates, and certain succinates. In some embodiments, the internal donors are as described in U.S. Pat. No. 4,522,930A, European Patent No. 045977A2, and Patent Cooperation Treaty Publication Nos. WO 00/63261 and WO 01/57099. In some embodiments, the internal donor is selected from the group consisting of phthalic acid esters and succinate acids esters. In some embodiments, the internal donor is an alkylphthalate. In some embodiments, the alkylphthalate is selected from the group consisting of diisobutyl phthalate, dioctyl phthalate, diphenyl phthalate, and benzyl-butyl phthalate.

In some embodiments, the particles of solid component (i) have substantially spherical morphology and an average diameter ranging between 5 and 150 m, alternatively from 20 to 100 m, alternatively from 30 to 90 m. As used herein, the term "substantially spherical morphology" refers to particles having the ratio between the greater axis and the smaller axis equal to or lower than 1.5, alternatively lower than 1.3.

In some embodiments, the amount of Mg ranges from 8 to 30 wt %, alternatively from 10 to 25 wt. %.

In some embodiments, the amount of Ti ranges from 0.5 to 7 wt %, alternatively from 0.7 to 5 wt. %.

In some embodiments, the solid catalyst component (i) is prepared by reacting a titanium compound of formula $Ti(OR)_{q-y}X_y$, where q is the valence of titanium and y is a number between 1 and q, with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct, thereby creating an emulsion which is quickly quenched causing the solidification of the adduct in form of spherical particles. In some embodiments, the procedure for the preparation of the spherical adducts is as disclosed in U.S. Pat. Nos. 4,399,054 and 4,469,648. In some embodiments, the resulting adduct is directly reacted with Ti compound or subjected to thermal controlled dealcoholation (80-130° C.), thereby obtaining an adduct wherein the number of moles of alcohol is lower than 3, alternatively between 0.1 and 2.5. In some embodiments, the reaction with the Ti compound is carried out by suspending the adduct (dealcoholated or as such) in cold $TiCl_4$; the mixture is heated up to 80-130° C. and kept at this temperature for 0.5-2 hours. In some embodiments, the treatment with $TiCl_4$ is carried out one or more times. In some embodiments, the electron donor compound is added during the treatment with $TiCl_4$.

In some embodiments, the alkyl-Al compound (ii) is selected from the group consisting of trialkyl aluminum compounds, alkylaluminum halides, alkylaluminum hydrides, and alkylaluminum sesquichlorides. In some embodiments, the alkyl-Al compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (ii) is an alkylaluminum sesquichloride selected from the group consisting of $AlEt_2Cl$ and $Al_2Et_3Cl_3$. In some embodiments, the alkyl-Al compound (ii) is a mixture including trialkylaluminums. In some embodiments, the Al/Ti ratio is higher than 1, alternatively between 50 and 2000.

In some embodiments, the silicon compounds (iii) are wherein a is 1, b is 1, c is 2, at least one of $R^7$ and $R^8$ is selected from branched alkyl, cycloalkyl or aryl groups with 3-10 carbon atoms optionally containing heteroatoms and $R^9$ is a $C_1$-$C_{10}$ alkyl group. In some embodiments, $R_9$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, and methyl(3,3,3-trifluoro-n-propyl)dimethoxysilane. In some embodiments, the silicon compounds are wherein a is 0, c is 3, $R^8$ is a branched alkyl or cycloalkyl group, optionally containing heteroatoms, and $R^9$ is methyl. In some embodiments, the silicon compounds are selected from the group consisting of cyclohexyltrimethoxysilane, t-butyltrimethoxysilane, and thexyltrimethoxysilane.

In some embodiments, the external electron donor compound (iii) is used in such an amount to give a molar ratio between the alkylaluminum compound and the external electron donor compound (iii) of from 0.1 to 200, alternatively from 1 to 100, alternatively from 3 to 50.

In some embodiments, the polymerization process is carried out in gas-phase, operating in one or more fluidized or mechanically agitated bed reactors, slurry polymerization using as diluent an inert hydrocarbon solvent, or bulk polymerization using the liquid monomer as a reaction medium. In some embodiments, the liquid monomer is propylene.

In some embodiments, the heterophasic composition is obtained with a sequential polymerization process in two or more stages, wherein component (a) is obtained in the first stage and then component (b) is obtained in the second stage in the presence of component (a). In some embodiments, each stage is in gas-phase, operating in one or more fluidized or mechanically agitated bed reactors, or bulk polymerization using the liquid monomer as a reaction medium. In some embodiments, the liquid monomer is propylene. In some embodiments, hybrid processes are used, wherein a first stage is carried out in liquid monomer and a second stage is carried out in gas-phase. In some embodiments, component (a) is prepared in the first stage. In some embodiments, component (b) is prepared in the second stage.

In some embodiments, and as described in European Patent No. 782587, component (a) is prepared in a gas-phase reactor having a first and a second interconnected polymerization zone to which propylene and optionally ethylene are fed in the presence of a catalyst system and from which the polymer produced is discharged. The growing polymer particles flow through the first of the polymerization zones (riser) under fast fluidization conditions, leave the first polymerization zone, enter the second of the polymerization zones (downcomer) through which the polymer particles flow in a densified form under the action of gravity, leave the second polymerization zone, and are reintroduced into said first polymerization zone, thereby establishing a circulation of polymer between the two polymerization zones. In some embodiments, the conditions of fast fluidization in the first polymerization zone are established by feeding the monomers gas mixture below the point of reintroduction of the growing polymer into the first polymerization zone. In some embodiments, the velocity of the transport gas into the first polymerization zone is higher than the transport velocity under the operating conditions and between 2 and 15 m/s. In the second polymerization zone, where the polymer flows in densified form under the action of gravity, high values of density of the solid are reached which approach the bulk density of the polymer. In some embodiments, a positive gain in pressure is thereby obtained along the direction of flow, permitting reintroduction of the polymer into the first reaction zone without the help of mechanical devices. In this way, a “loop” circulation is set up, which is defined by the balance of pressures between the two polymerization zones and by the head loss introduced into the system. In some embodiments, one or more inert gases, such as nitrogen or an aliphatic hydrocarbon, are maintained in the polymerization zones, in quantities such that the sum of the partial pressures of the inert gases is between 5 and 80% of the total pressure of the gases. In some embodiments, the various catalyst components are fed to the first polymerization zone, at any point of the first polymerization zone. In some embodiments, the various catalyst components are fed at any point of the second polymerization zone. In some embodiments, molecular weight regulators are used to regulate the molecular weight of the growing polymer. In some embodiments, the molecular weight regulator is hydrogen. In some embodiments, a bimodal set-up is achieved with the use of a barrier stream as described European Patent Application No. EP-A-1012195, thereby separating the polymerization environment of riser and downer.

In some embodiments, the polymerization is carried out at temperature of from 20 to 120° C., alternatively of from 40 to 80° C. In some embodiments, the polymerization is carried out in gas-phase and the operating pressure is between 0.5 and 5 MPa, alternatively between 1 and 4 MPa. In some embodiments, the polymerization is carried out in bulk polymerization and the operating pressure ranges between 1 and 8 MPa, alternatively between 1.5 and 5 MPa. In some embodiments, hydrogen is used as a molecular weight regulator.

In some embodiments, the final heterophasic composition made from or containing (a)+(b) is subject to a chemical treatment with organic peroxides, thereby lowering the average molecular weight and increasing the melt flow index for a specific application.

In some embodiments, the polypropylene composition is made from or containing the components (a)-(c) and optionally, additives, fillers, and pigments. In some embodiments, the additives are selected from nucleating agents and extension oils. In some embodiments, the fillers are mineral fillers. In some embodiments, the pigments are selected from the group consisting of organic and inorganic pigments. In some embodiments, the fillers are inorganic fillers selected from the group consisting of talc, calcium carbonate, and mineral fillers.

In some embodiments, the nucleating agents are added in quantities ranging from 0.05 to 2% by weight, alternatively from 0.1 to 1% by weight, with respect to the total weight.

In some embodiments, the polypropylene composition is used for obtaining injection-molded articles of manufacture. In some embodiments, the polypropylene compositions are for the preparation of automotive battery cases.

The following examples are given to illustrate, but not limit the present disclosure.

EXAMPLES

Characterizations

Xylene-Soluble (XS) Fraction at 25° C.

2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid were poured into a pre-weighed aluminum container, which was heated on a heating plate under nitrogen flow, thereby removing the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);

XS of components B) and C) were calculated by using the formula:

$$XStot = WaXSA + WbXSB + WcXSC$$

wherein Wa, Wb and Wc were the relative amount of components A, B and C, respectively, and (A+B+C=1).

Melt Flow Rate (MFR)

Measured according to ISO 1133 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Polydispersity index: Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus, the polydispersity index was determined using the equation:

$$P.I. = 105/Gc$$

wherein Gc is the crossover modulus, which is defined as the value (expressed in Pa) at which G'=G", wherein G' is the storage modulus and G" is the loss modulus.

Ethylene (C2) Content $^{13}$C NMR of Propylene/Ethylene Copolymers $^{13}$C NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as internal standard at 29.9 ppm. The samples were dissolved in 1,1,2,2-tetrachloroethane-d2 at 120° C. with an 8% wt/v concentration. Each spectrum was acquired with a 900 pulse, 15 seconds of delay between pulses and CPD, thereby removing 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with 6-titanium trichloride-diethylaluminum chloride" M. Kakugo, Y. Naito, K. Mizunuma and T. Miyatake, Macromolecules, 1982, 15, 1150) using the following equations:

$$PPP = 100T_{\beta\beta}/S$$

$$PPE = 100T_{\beta\delta}/S$$

$$EPE = 100T_{\delta\delta}/S$$

$$PEP = 100S_{\beta\beta}/S$$

$$PEE = 100S_{\beta\delta}/S$$

$$EEE = 100(0.25S_{\gamma\delta} + 0.5S_{\delta\delta})/S$$

$$S = T_{\beta\beta} + T_{\beta\delta} + T_{\delta\delta} + S_{\beta\beta} + S_{\beta\delta} + 0.25S_{\gamma\delta} + 0.5S_{\delta\delta}$$

The molar percentage of ethylene content was evaluated using the following equation:

$$E\%\ \text{mol} = 100*[PEP + PEE + EEE]$$

The weight percentage of ethylene content was evaluated using the following equation:

$$E\%\ \text{wt.} = \frac{100*E\%\ \text{mol}*\text{MW}_E}{E\%\ \text{mol}*\text{MW}_E + P\%\ \text{mol}*\text{MW}_P}$$

where P % mol is the molar percentage of propylene content, while $\text{MW}_E$ and $\text{MW}_P$ are the molecular weights of ethylene and propylene, respectively.

The product of reactivity ratio $r_1/r_2$ was calculated according to Carman (C. J. Carman, R. A. Harrington and C. E. Wilkes, Macromolecules, 1977; 10, 536) as:

$$r_1r_2 = 1 + \left(\frac{EEE + PEE}{PEP} + 1\right) - \left(\frac{P}{E} + 1\right)\left(\frac{EEE + PEE}{PEP} + 1\right)^{0.5}$$

The tacticity of Propylene sequences was calculated as mm content from the ratio of the PPP mm $T_{\beta\beta}$ (28.90-29.65 ppm) and the whole $T_{\beta\beta}$ (29.80-28.37 ppm).

Samples for the Mechanical Tests

Samples have been obtained according to ISO 1873-2: 2007.

Charpy impact test was determined according to ISO 179-1eA, and ISO 1873-2

Elongation at yield: measured according to ISO 527.

Elongation at break: measured according To ISO 527

Stress at break: measured according to ISO 527.

Tensile Modulus according to ISO 527-2,

Melting Point and Crystallization Point

The melting point was measured by using a DSC instrument according to ISO 11357-3, at scanning rate of 20° C./min both in cooling and heating, on a sample of weight between 5 and 7 mg., under inert $N_2$ flow. Instrument calibration made with Indium.

Determination of PP Inclusions in r-PE $^{13}C$ NMR spectra were acquired on a Bruker AV-600 spectrometer equipped with cryoprobe, operating at 160.91 MHz in the Fourier transform mode at 120° C.

The peak of the $CH_2$ ethylene was used as internal standard at 29.9 ppm. The samples were dissolved in 1,1,2,2-tetrachloroethane-d2 at 120° C. with an 8% wt/v concentration. Each spectrum was acquired with a 900 pulse, 15 seconds of delay between pulses and CPD, thereby removing $^{1}H$-$^{13}C$ coupling. 512 transients were stored in 32K data points using a spectral window of 9000 Hz.

Molar composition was obtained according to the following using peak areas (Table 1):

$$P = 100A_3/S$$

$$E = 100\ 0.5A_2/S$$

$$\text{Where } S = 0.5A_2 + A_3$$

Molar content was transformed in weight using monomers molecular weight.

TABLE 1

Assignment of PP/PE mixtures

| Number | Chemical Shift (ppm) | Carbon | Sequence |
|---|---|---|---|
| 1 | 48.8-45.4 | $CH_2$ | P |
| 2 | 29.9 | $CH_2$ | E |
| 3 | 29.0-28.0 | CH | P |
| 4 | 21.8-19.8 | $CH_3$ | P |

EXAMPLES

Example 1

In a plant operating continuously according to the mixed liquid-gas polymerization technique, the polymerization processes were carried out under the conditions specified in Table 1.

The polymerization was carried out in the presence of a catalyst system in a series of two reactors equipped with devices to transfer the product from the first reactor to the second reactor.

Preparation of the Solid Catalyst Component

Into a 500 ml four-necked round flask, purged with nitrogen, 250 ml of $TiCl_4$ were introduced at 0° C. While stirring, 10.0 g of microspheroidal $MgCl_2 \cdot 1.9C_2H_5OH$ (prepared according to the method described in Example 2 of U.S. Pat. No. 4,399,054 but operating at 3000 rpm instead of 10000 rpm) and 9.1 mmol of diethyl 2,3-(diisopropyl) succinate were added. The temperature was raised to 100° C. and maintained for 120 min. Then, the stirring was discontinued. The solid product was allowed to settle. The supernatant liquid was siphoned off. Then 250 ml of fresh $TiCl_4$ were added. The mixture was reacted at 120° C. for 60 min. Then, the supernatant liquid was siphoned off. The solid was washed six times with anhydrous hexane (6×100 ml) at 60° C.

Catalyst System and Prepolymerization Treatment

The solid catalyst component was contacted at 12° C. for 24 minutes with aluminum triethyl (TEAL) and dicyclopentyldimethoxysilane (DCPMS) as outside-electron-donor component. The weight ratio between TEAL and the solid catalyst component and the weight ratio between TEAL and DCPMS are specified in Table 1.

The catalyst system was then subjected to prepolymerization by suspending the catalyst system in liquid propylene at 20° C. for about 5 minutes before introducing the catalyst system into the first polymerization reactor.

Polymerization

The polymerization was carried out in continuous mode in a series of two reactors equipped with devices to transfer the product from the first reactor to the second reactor. The first reactor was a gas-phase polymerization reactor having two interconnected polymerization zones (riser and downer) as described in the European Patent No. 782587. The second reactor was a fluidized bed gas phase reactor. Polymer (a) was prepared in the first reactor, while polymer (b) was prepared in the second reactor. Temperature and pressure were maintained constant throughout the reaction. Hydrogen was used as molecular weight regulator.

The gas phase (propylene, ethylene, and hydrogen) was continuously analyzed via gas-chromatography.

At the end of the polymerization process, the powder was discharged and dried under a nitrogen flow.

Before being mixed with component (c), the heterophasic composition having a melt flow index of 1.5 was subjected to an organic peroxide treatment, thereby lowering the average molecular weight and bringing the melt flow index to 6.0 g/10 min.

Then the polymer particles of the heterophasic composition were introduced into a twin-screw extruder (Werner-type extruder), wherein the polymer particles were mixed with 10% wt (based on the total amount of polyolefins) of QCP5603 ivory (a r-PE commercially available from LyondellBasell, containing 10% wt of PP inclusions) and a stabilization package. The polymer particles were extruded under nitrogen atmosphere in a twin-screw extruder, at a rotation speed of 250 rpm and a melt temperature of 200-250° C.

Comparative Example 1

Example 1 was repeated under the conditions specified in Table 1, except that the heterophasic composition was mechanically blended with 10 wt. % of Hostalen GF4750, which was a virgin HDPE commercially available from LyondellBasell.

Comparative Example 2

A commercially-available polymer composition had the same structure (a)/(b)/(c), and substantially the same composition, of example 1 with the difference that the component (c) was introduced via sequential polymerization as described in Patent Cooperation Treaty Publication No. WO2006/125720.

TABLE 1

| Polymerization Process | | | |
|---|---|---|---|
| | | 1 | 1c |
| Component A | | | |
| TEAL/external donor | wt/wt | 5 | 5 |
| TEAL/catalyst | wt/wt | 5 | 5 |
| Temperature | ° C. | | |
| Pressure | barg | | |
| $H_2/C_3^-$ riser | mol/mol | 0.011 | 0.011 |
| MFR | g/10 min | 3 | 3 |
| XS | wt % | 1.8 | 1.8 |
| Tm | ° C. | | |
| Component B | | | |
| Temperature | ° C. | 75 | 75 |
| Pressure | MPa | 1.8 | 1.8 |
| Split | % | 13.5 | 13.5 |
| $C_2^-/C_2^- + C_3^-$ | mol/mol | 0.35 | 0.35 |
| H2/C2− | mol/mol | 0.014 | 0.014 |
| XSIV | dl/g | 4.6 | 4.6 |
| MFR | g/10 min | 3.1 | 3.1 |

TABLE 2

| Characterization | | |
|---|---|---|
| Example | 1 | 1c |
| Crystalline propylene homopolymer | | |
| Homopolymer content, wt % | 78 | 78 |
| MFR, g/10 min | 2.0 | 2.0 |
| Polydispersity Index | 5.6 | 5.6 |
| Pentad content, molar % | | |
| Xylene soluble fraction, wt % | 1.5 | 1.5 |
| Propylene-ethylene copolymer | | |
| Copolymer content, wt % | 12 | 12 |
| Ethylene content in EPR (Calculated), wt. % | 47 | 47 |
| Intrinsic viscosity [η] of the xylene-soluble fraction, dl/g | 4.7 | 4.7 |
| Polyethylene | | |
| Polyethylene content, wt % | 10 | 10 |
| Density g/cm$^3$ | 0.95 | 0.95 |
| Melt Index "E" g/10 min. | 0.3 | 0.4 |

TABLE 3

| Properties of the final compositions | | | | |
|---|---|---|---|---|
| Examples and comparative examples | | 1 | 1c | 2c |
| MFR, g/10 min | | 4.9 | 4.9 | 4.8 |
| Tensile Modulus, MPa | | 1410 | 1380 | 1530 |
| Tensile Strength at yield, MPa | | 26.9 | 26.6 | 29.1 |
| Elongation at yield, % | | 6.3 | 6.2 | 8.5 |
| Tensile Strength at break, MPa | | 17.9 | 16.9 | 17.8 |
| Elongation at break, % | | 150.0 | 135 | 200 |
| Charpy kJ/m$^2$ | at 23° C. | 11.1 | 10.5 | 8.7 |
| | at 0° C | 7.2 | 7.7 | 4.8 |
| | at −20° C. | 5.5 | 5.7 | 3.6 |

What is claimed is:

1. A polypropylene composition comprising:

(a) 65 to 85 weight % of a crystalline propylene polymer having an amount of isotactic pentads (mmmm), measured by $^{13}$C-MNR on the fraction insoluble in xylene at 25° C., higher than 97.0 molar % and a polydispersity index ranging from 3 to 15;

(b) 5 to 25 weight % of an elastomeric copolymer of ethylene and propylene, wherein the copolymer having an amount of recurring units deriving from ethylene ranging from 30 to 70 weight % and being partially soluble in xylene at ambient temperature; wherein the polymer fraction soluble in xylene at ambient temperature having an intrinsic viscosity value ranging from 3 to 10 dl/g; and (c) 5 to 25 weight % of recycled polyethylene (r-PE) having a melt flow rate (190° C./2.16 Kg) from 0.1 to 10 g/10 min and containing an amount of polypropylene inclusions ranging from 1 to 15 weight % of the total r-PE component, wherein the polypropylene composition has: a Charpy impact resistance at 23° C. from more than 10 to 15 kJ/m$^2$, and has a value of melt flow rate (ISO 1133 230° C./2.16 kg) ranging from higher than 3.0 g/10 min. to 15 g/10 min.; the percentages of (a), (b) and (c) being referred to the sum of (a), (b) and (c).

2. The polypropylene composition according to claim 1, wherein component (a) ranges from 70 to 83%, by weight;
component (b) ranges from 7 to 20% by weight; and
component (c) ranges from 7 to 20% by weight.

3. The polypropylene composition according to claim 2, wherein component (a) ranges from 75 to 80%, by weight;
component (b) ranges from 8 to 15% by weight; and
component (c) ranges from 8 to 15% by weight.

4. The polypropylene composition according to claim 1, having a melt flow rate (ISO 1133 230° C./2.16 kg) ranging from 3.5 to 10 g/10 min.

5. The polypropylene composition according to claim 1, wherein component (c) has an amount of PP inclusions ranging from 5 to 10% wt based on the total weight of component (c).

6. The polypropylene composition according to claim 1, wherein component (c) has a density ranging from 0.940 to 0.965 g/cm$^3$ and a melt flow rate (190° C./2.16 Kg ISO 1133-1) from 0.1 to 1 g/10 min.

7. The polypropylene composition according to claim 1, wherein, in the component (a), the amount of isotactic pentads (mmmm), measured by $^{13}$C-MNR on the fraction insoluble in xylene at 25° C. is higher than 97.5 molar %.

8. The polypropylene composition according to claim 1, wherein the component (a) has a polydispersity Index ranging from 3 to 10.

9. The polypropylene composition according to claim 1, wherein component (b) has amount of ethylene ranging from 40 to 60 wt. %.

10. The polypropylene composition according to claim 1, wherein, in component (b), the intrinsic viscosity of the xylene soluble fraction at 25° C. ranges from 3.5 to 8 dl/g.

11. The polypropylene composition according to claim 1, wherein, in component (b), the intrinsic viscosity of the xylene soluble fraction at 25° C. ranges from 4 to 6 dl/g.

12. An injection-molded article comprising the polypropylene composition according to claim 1.

13. The injection-molded article of claim 12, having the form of an automotive battery case.

* * * * *